(12) United States Patent
Yang et al.

(10) Patent No.: US 10,898,979 B2
(45) Date of Patent: *Jan. 26, 2021

(54) BLANK ASSEMBLY FOR HOUSING, HOUSING, MANUFACTURING METHOD FOR HOUSING AND TERMINAL

(71) Applicant: GUANGDONG OPPO MOBILE TELECOMMUNICATIONS CORP., LTD., Guangdong (CN)

(72) Inventors: Guangming Yang, Guangdong (CN); Wenfeng Sun, Guangdong (CN); Qiao Yan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,059

(22) Filed: Jun. 7, 2019

(65) Prior Publication Data
US 2019/0291221 A1    Sep. 26, 2019

Related U.S. Application Data

(63) Continuation of application No. 15/799,765, filed on Oct. 31, 2017.

(30) Foreign Application Priority Data

Jan. 24, 2017 (CN) .......................... 2017 1 0055133
Jan. 24, 2017 (CN) .................... 2017 2 0096965 U

(51) Int. Cl.
*H01Q 13/10* (2006.01)
*B23P 19/04* (2006.01)
(Continued)

(52) U.S. Cl.
CPC ............ *B23P 19/04* (2013.01); *G06F 1/1626* (2013.01); *H04M 1/0202* (2013.01);
(Continued)

(58) Field of Classification Search
CPC .............................. H01Q 13/10; H01Q 13/18
(Continued)

(56) References Cited

U.S. PATENT DOCUMENTS 9,190,713 B2   11/2015 Eom et al.
9,462,096 B2   10/2016 Han et al.
(Continued)

FOREIGN PATENT DOCUMENTS

CN    103260364 A    8/2013
CN    104378462 A    2/2015
(Continued)

OTHER PUBLICATIONS

Chinese Patent Application No. 201710055133.2, Office Action dated Jul. 16, 2018, 6 pages.
(Continued)

*Primary Examiner* — William P Watkins, III
(74) *Attorney, Agent, or Firm* — Lathrop GPM LLP

(57) ABSTRACT

A blank assembly for a housing, a housing, a manufacturing method for a housing and a terminal are provided. The blank assembly includes: a first blank having an inner wall defining a through slit along a thickness direction of the first blank, the slit having a width ranges from 0.3 to 0.5; a second blank having a part extending into the slit, the part having an outer surface spaced apart from the inner wall, a maximum depth of the second blank extending into the slit being less than a thickness of the first blank; and a filling layer filled in the slit.

17 Claims, 7 Drawing Sheets

(51) Int. Cl.
*G06F 1/16* (2006.01)
*H04M 1/02* (2006.01)
*A45C 11/00* (2006.01)
*H01Q 1/24* (2006.01)
*H01Q 13/18* (2006.01)

(52) U.S. Cl.
CPC ........ *A45C 2011/002* (2013.01); *H01Q 1/243* (2013.01); *H01Q 13/10* (2013.01); *H01Q 13/18* (2013.01)

(58) Field of Classification Search
USPC ........................................................ 428/139
See application file for complete search history.

(56) References Cited

U.S. PATENT DOCUMENTS

| | | |
|---|---|---|
| 2010/0283697 A1 | 11/2010 | Hsieh et al. |
| 2011/0148722 A1 | 6/2011 | Bellows |
| 2012/0139795 A1 | 6/2012 | Choi et al. |
| 2012/0157175 A1 | 6/2012 | Golko et al. |
| 2017/0309991 A1 | 10/2017 | Noori et al. |
| 2018/0098448 A1 | 4/2018 | Baek et al. |

FOREIGN PATENT DOCUMENTS

| | | |
|---|---|---|
| CN | 104602476 A | 5/2015 |
| CN | 105703060 A | 6/2016 |
| CN | 105789833 A | 7/2016 |
| CN | 205595455 U | 9/2016 |
| CN | 106102389 A | 11/2016 |
| CN | 106129620 A | 11/2016 |
| CN | 106163157 A | 11/2016 |
| CN | 106210200 A | 12/2016 |
| CN | 106299599 A | 1/2017 |
| CN | 206425777 U | 8/2017 |
| CN | 106736381 B | 4/2019 |
| JP | 2015222835 A | 12/2015 |
| JP | 5886343 B2 | 3/2016 |
| JP | 2017034651 A | 2/2017 |
| KR | 20160052311 A | 5/2016 |
| WO | WO 2014156285 A1 | 10/2014 |
| WO | WO 2015152363 A1 | 10/2015 |

OTHER PUBLICATIONS

Chinese Patent Application No. 201710055133.2, English translation of Office Action dated Jul. 16, 2018, 5 pages.
Chinese Patent Application No. 201710055133.2, Notification to Grant Patent Right for Invention dated Mar. 1, 2019, 1 page.
Chinese Patent Application No. 201710055133.2, English translation of Notification to Grant Patent Right for Invention dated Mar. 1, 2019, 2 pages.
Chinese Patent Application No. 201710055133.2, Allowed Claims as of Mar. 1, 2019, with English translation, 3 pages.
European Patent Application No. 18211836.4 extended Search and Opinion dated May 2, 2019, 5 pages.
U.S. Appl. No. 15/799,765, Office Action dated Jul. 11, 2019, 7 pages.
Indian Patent Application No. 201734039252 Office Action dated Sep. 27, 2019, 8 pages.
U.S. Appl. No. 15/799,765, final Office Action dated Dec. 30, 2019, 12 pages.
Japanese Patent Application No. 2019-534887 Office Action dated May 19, 2020, 3 pages.
Japanese Patent Application No. 2019-534887 English translation of Office Action dated May 19, 2020, 4 pages.
U.S. Appl. No. 15/799,765, non-final Office Action dated Apr. 2, 2020, 7 pages.
Japanese Patent Application No. 2019-534887, Decision to Grant a Patent dated Sep. 1, 2020, 3 pages.
Japanese Patent Application No. 2019-534887, English translation of Decision to Grant a Patent dated Sep. 1, 2020, 3 pages.
Chinese Patent Application No. 201910180911.X, First Office Action dated Jul. 3, 2020, 9 pages.
Chinese Patent Application No. 201910180911.X, English translation of First Office Action dated Jul. 3, 2020, 9 pages.
U.S. Appl. No. 15/799,765 Office Action dated Aug. 7, 2020, 7 pages.

BLANK ASSEMBLY FOR HOUSING, HOUSING, MANUFACTURING METHOD FOR HOUSING AND TERMINAL

CROSS-REFERENCE TO RELATED APPLICATION

This application is a Continuation Application of U.S. application Ser. No. 15/799,765, filed Oct. 31, 2017, which claims priority to and benefits of Chinese Patent Application No. 201720096965.4, filed with China National Intellectual Property Administration on Jan. 24, 2017, and Chinese Patent Application No. 201710055133.2, filed with China National Intellectual Property Administration on Jan. 24, 2017, the entire contents of which are incorporated herein by reference.

FIELD

The present disclosure relates to a technical field of communication devices, and more particularly, to a blank assembly for a housing, a housing, a manufacturing method for a housing and a terminal.

BACKGROUND

In the related art, in order to solve a performance problem of an antenna, a mobile phone having an all-metal frame may define one or more slits on the metal frame for the most part. A tiny metal strip is filled in the defined slit to form a micro-slit structure, and for the antenna designed based on the micro-slit structure, influence on the antenna is generally great when hands or other parts of a human body are in close contact with the micro-slit strip, which greatly worsen the performance of the antenna.

During the processing of the micro slit, a micro antenna slit may be firstly processed by means of a CNC, and the antenna slit may be filled by dispensing adhesive to achieve the appearance.

SUMMARY

A blank assembly for a housing is provided. The blank assembly includes a first blank having an inner wall defining a through slit along a thickness direction of the first blank, the slit having a width ranging from 0.3 to 0.5; a second blank having a part extending into the slit, the part having an outer surface spaced apart from the inner wall, a maximum depth of the second blank extending into the slit being less than a thickness of the first blank; and a filling layer filled in the slit.

A housing for a terminal is provided, the housing for the terminal is formed by machining the above-mentioned blank assembly.

A terminal is provided, the terminal includes the above-mentioned housing.

A manufacturing method for a housing is further provided, the manufacturing method includes choosing a first blank, the first blank having an inner wall defining a slit; choosing a second blank, the second blank having a protrusion portion; mounting the second blank on the first blank, the protrusion portion extending into the slit; filling a filler in the slit to form a filling layer, the filler being provided between an outer surface of the protrusion portion and the inner wall; and removing a part of the second blank located outside the slit, to form the housing.

DETAILED DESCRIPTION

Figure 1:
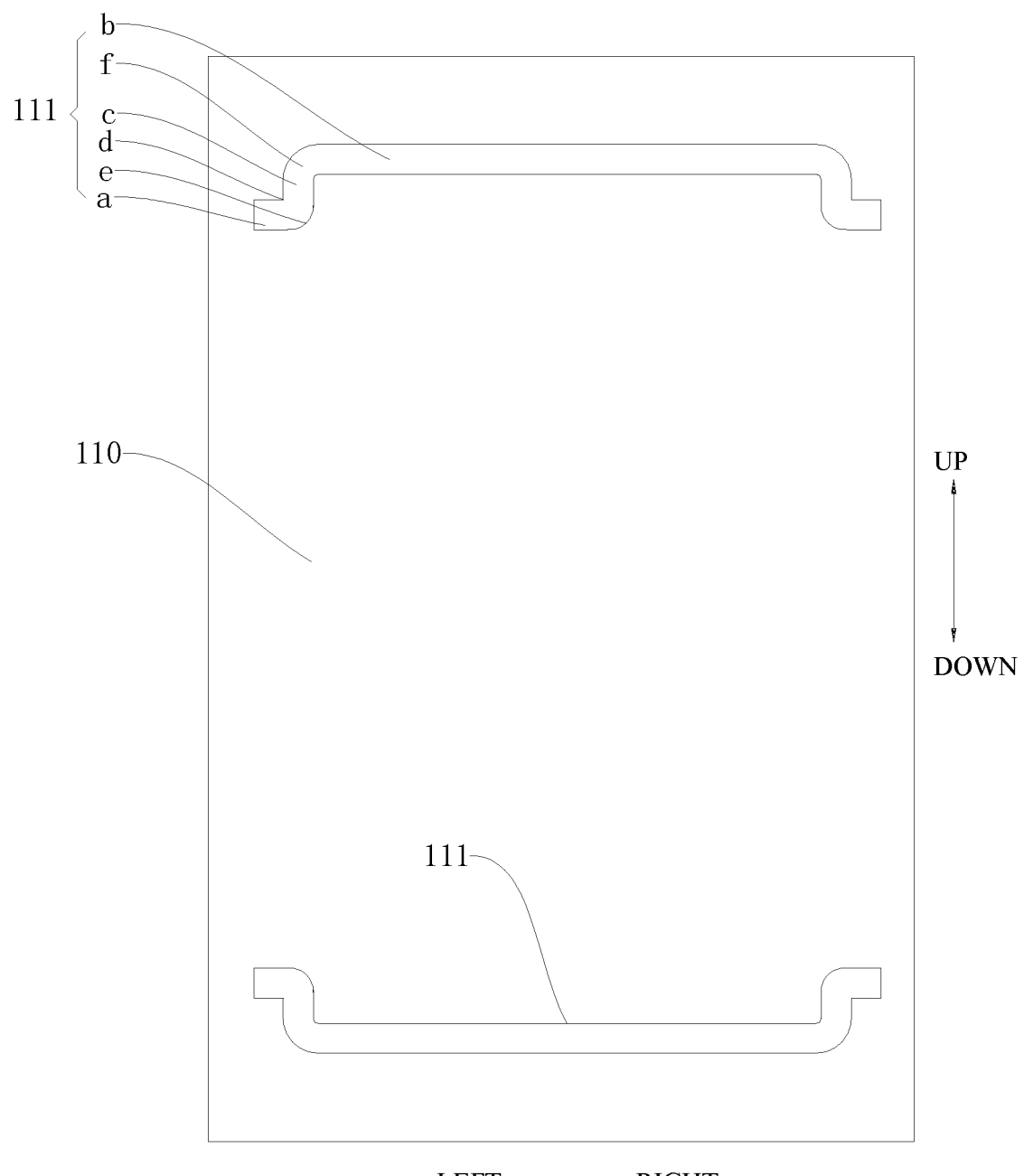
FIG. 1 illustrates a schematic view of a first blank of a blank assembly according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as illustrated in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

A blank assembly 100 for a housing 200, the housing 200 for a terminal 300, a manufacturing method for the housing 200 and the terminal 300 according to embodiments of the present disclosure will be described in detail with reference to FIGS. 1-9 in the following.

Figure 7:
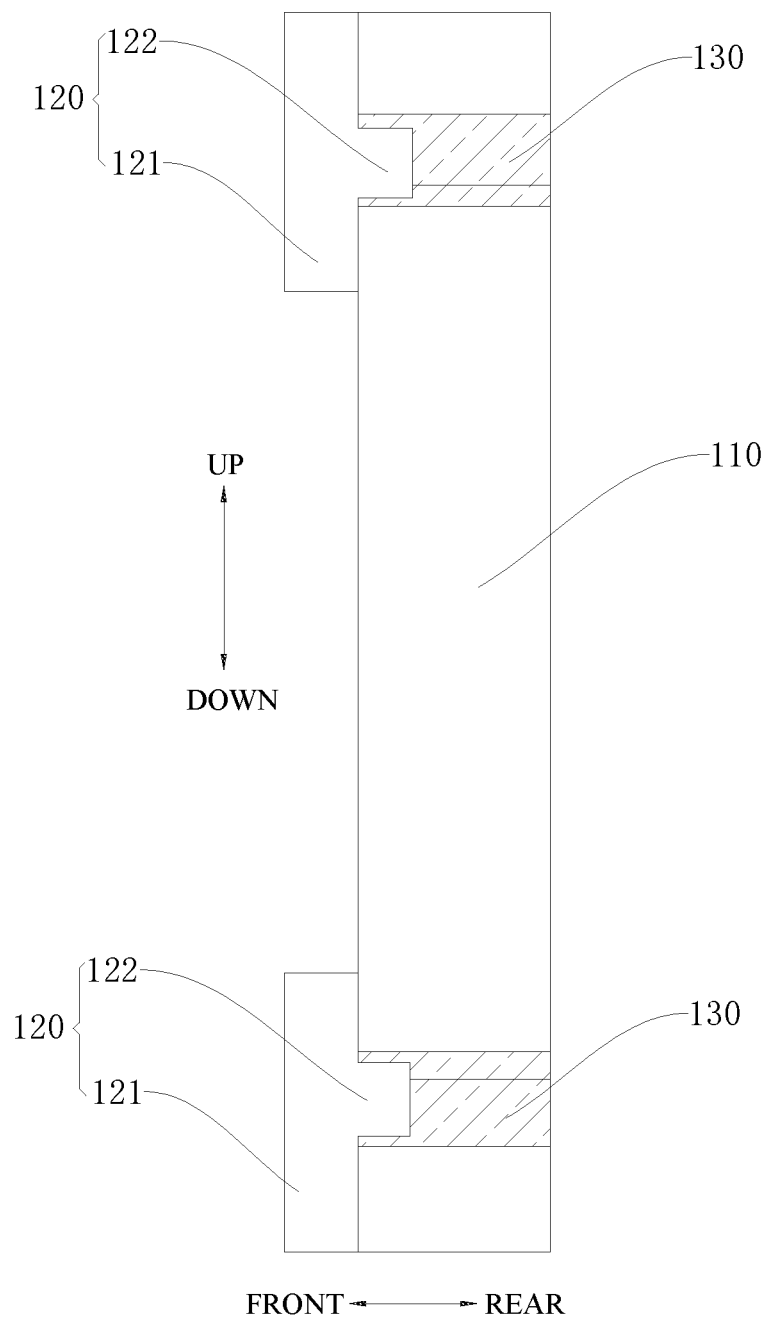
FIG. 7 illustrates a right view of a blank assembly according to embodiments of the present disclosure, in which a slit is filled with a filling layer.

As illustrated in FIG. 7, the blank assembly 100 for the housing 200 according to embodiments of the present disclosure includes a first blank 110, a second blank 120 and a filling layer 130.

Figure 6:
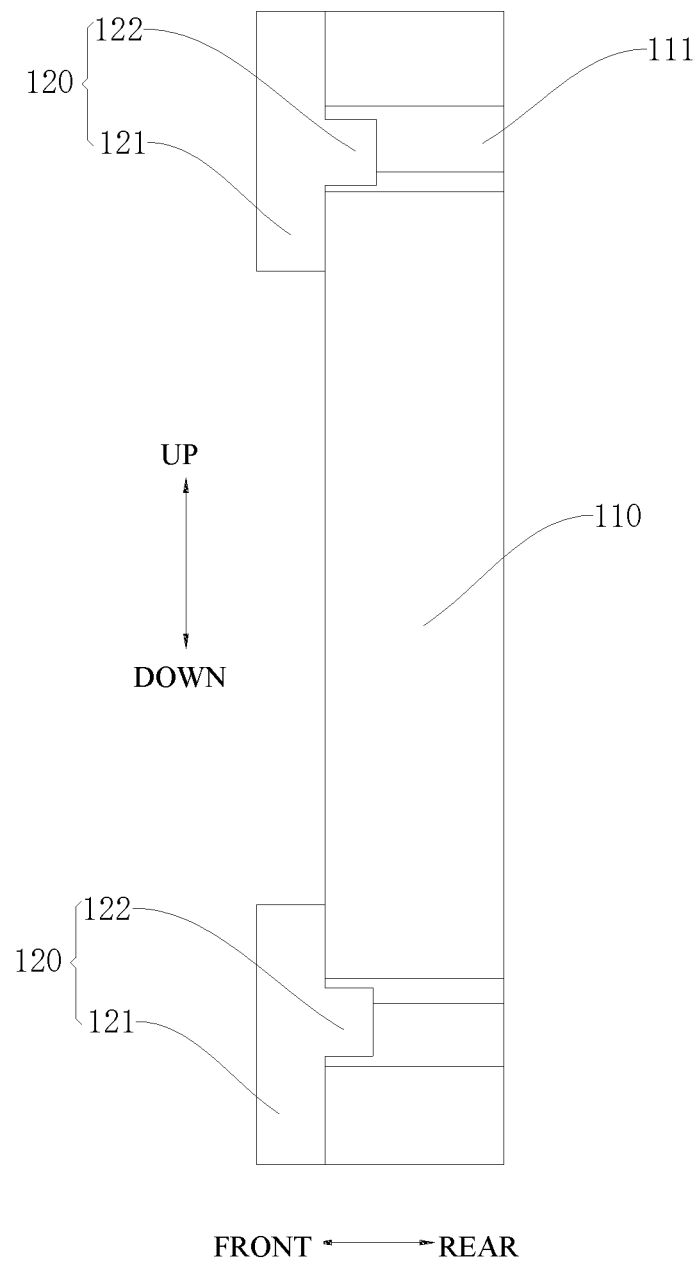
FIG. 6 illustrates a right view of a blank assembly according to embodiments of the present disclosure, in which a slit is not filled with a filling layer.

Specifically, the first blank 110 is provided with a through slit 111 along a thickness direction of the first blank 110. For example, as illustrated in FIGS. 1 and 6, the slit 111 generally extends along a left-right direction of the first blank 110, and the slit 111 runs through the first blank 110 in a front-rear direction illustrated in FIG. 6, i.e., the front-rear direction illustrated in FIG. 6 is the thickness direction of the first blank 110. The second blank 120 having a part extends into the slit 111, that is, the part of the second blank 120 is located in the slit 111 and the other part of the second blank 120 is located outside the slit 111. An outer surface of the second blank 120 located in the slit 111 is apart from an inner wall of the slit 111, in other words, a wall surface of the first blank 110 corresponding to the slit 111 is not in contact with the part of the second blank 120 located in the slit 111. In order to connect the part of the second blank 120 located in the slit 111 with the first blank 110, the filling layer 130 may be filled in the slit 111, such that the first blank 110 may be connected with the part of the second blank 120 located in the slit 111. It could be understood that, the filling layer 130 may have a certain viscosity, and when the filling layer 130 is filled in the slit 111, a filler surrounds at a periphery of the part of the second blank 120 located in the slit 111 and is adhered to the second blank 120, in the meanwhile the filler may also be adhered to an inner wall surface of the slit 111, such that the first blank 110 and the part of the second blank 120 located in the slit 111 may be firmly connected together.

In the blank assembly 100 for the housing 200 according to embodiments of the present disclosure, the second blank 120 partially extends into the slit 111 and the filler is filled in the slit 111 to connect the part of the second blank 120 located in the slit 111 with the first blank 110, the second blank 120 may be partially arranged in the slit 111 in an embedding manner. During the subsequent processing, the part of the second blank 120 located outside the slit 111 may be directly cut so as to further form the housing 200, thus making it convenient for the blank assembly 100 to be processed into the housing 200 for the terminal 300, thereby simplifying the manufacturing process of the housing 200, improving the yield of the housing 200 and reducing the production cost.

According to an embodiment of the present disclosure, a width W of the slit 111 may range from 0.3 to 0.5 mm. For example, as illustrated in FIG. 6, the width of the slit 111 may be a width of the slit 111 in an up-down direction illustrated in FIG. 6. The slit 111 may separate the housing 200 into two parts, and part of the housing 200, the part of the second blank 120 located in the slit 111 and the slit 111 may be configured as a part of antenna of the terminal 300, thus improving an anti-interference capability of the antenna, thereby improving the communication performance of the terminal 300. After verification by experiments, when the width of the slit 111 ranges from 0.3 to 0.5 mm, the anti-interference capability of the antenna and the communication performance of the terminal 300 are greater.

In an example of the present disclosure, as illustrated in FIG. 6, a maximum length of the part of the second blank 120 extending into the slit 111 is less than a thickness of the first blank 110. For example, as illustrated in FIG. 6, the length of the part of the second blank 120 extending into the slit 111 may be a length of the part of the second blank 120 located in the slit 111 in the front-rear direction, and the thickness of the first blank 110 may refer to a thickness of the first blank 110 in the front-rear direction. On one hand, a volume of the part of the second blank 120 located in the slit 111 may be reduced, thus increasing the amount of the filler, thereby improving the connection strength between the second blank 120 and the first blank 110. On the other hand, the anti-interference capability of the antenna may be improved and the communication performance of the terminal 300 may be greater.

Figure 3:
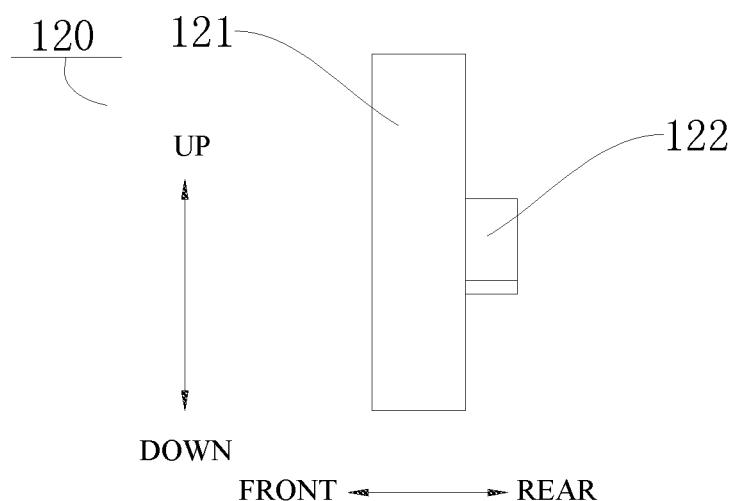
FIG. 3 illustrates a left view of the second blank of the blank assembly according to embodiments of the present disclosure.

In order to conveniently process the second blank 120, according to an embodiment of the present disclosure, as illustrated in FIG. 3, the second blank 120 may include: a body portion 121 and a protrusion portion 122. Specifically, the protrusion portion 122 is provided to the body portion 121, and at least part of the protrusion portion 122 is located in the slit 111. The protrusion portion 122 is fitted with the slit 111, such that the second blank 120 may be easily fitted with the first blank 110. During the subsequent processing, the housing 200 for the terminal 300 may be formed after cutting the body portion 121, thus facilitating the subsequent processing of the blank assembly 100, thereby simplifying the manufacturing process of the housing 200, improving the yield of the housing 200, and reducing the production cost. Certainly, in order to improve an accuracy of the assembly between the first blank 110 and the second blank 120, the protrusion portion 122 may completely extend into the slit 111.

In order to make it convenient for the protrusion portion 122 to be fitted with the slit 111, the slit 111 may have the same shape that the protrusion portion 122 has. For example, as illustrated in FIG. 1, the blank assembly 100 includes one first blank 110 and two second blanks 120, each the second blank 120 is provided with one protrusion portion 122, the first blank 110 defines two slits 111, each the protrusion portion 122 corresponds to and fitted with one slit 111. It should be noted that, the two slits 111 may be symmetrical in the up-down direction, and for easy description, the slit 111 located above is taken as the example.

As illustrated in FIG. 1, the slit 111 may include one second straight segment b, two first straight segments a and two vertical connecting segments c. The slit 111 generally extends along the left-right direction, the first straight segments a and the second straight segment b extend along a horizontal direction (the left-right direction illustrated in FIG. 1), the first straight segments a are spaced apart from the second straight segment b in the up-down direction (the up-down direction illustrated in FIG. 1), and the two first straight segments a are located at two ends of the second straight segment b along the left-right direction. The vertical connecting segments c extend along the up-down direction (the up-down direction illustrated in FIG. 1), one of the two vertical connecting segments c is used to connect the first straight segment a located at the left side to a left end of the second straight segment b, the other one of the two vertical connecting segments c is used to connect the first straight segment a located at the right side to a right end of the second straight segment b. A smooth-transition connecting portion f is provided between the second straight segment b and the corresponding vertical connecting segment c.

As illustrated in FIG. 1, a right angle d is defined between a side wall surface of the first straight segment a facing upwards and the corresponding vertical connecting segment c. After verification by the experiments, when the right angle d is defined between the side wall surface of the first straight segment a facing upwards and the corresponding vertical connecting segment c, the anti-interference capacity of the signal of the antenna is enhanced. A rounded corner e is defined between a side wall surface of the first straight segment a facing downwards and the corresponding vertical connecting segment c. After verification by the experiments, when the rounded corner e is defined between the side wall surface of the first straight segment a facing downwards and the corresponding vertical connecting segment c, the anti-interference capacity of the signal of the antenna is enhanced.

Figure 2:
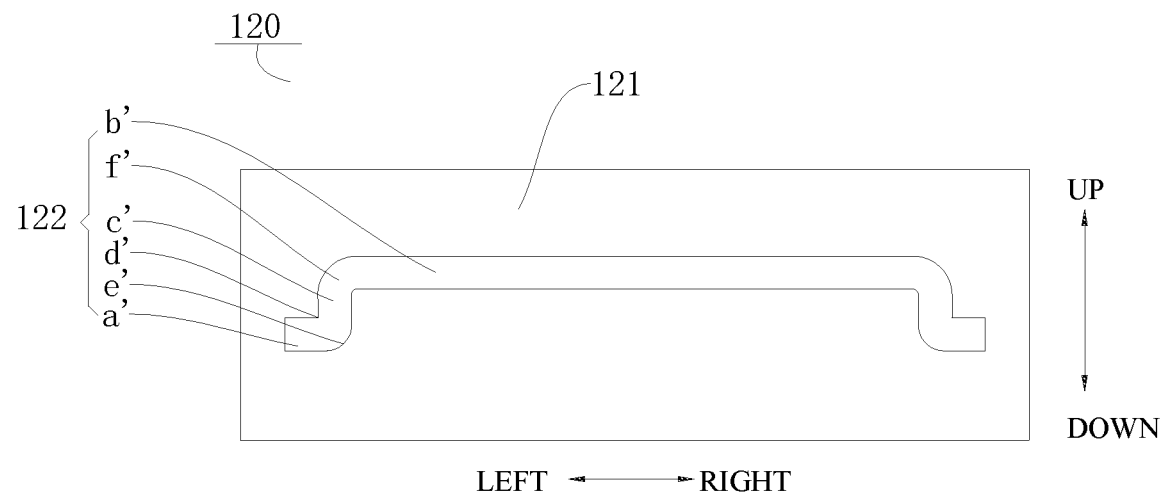
FIG. 2 illustrates a schematic view of a second blank of a blank assembly according to embodiments of the present disclosure.

Correspondingly, the protrusion portion 122 has the same shape that the slit 111 has. Specifically, as illustrated in FIG. 2, the protrusion portion 122 may include one second straight segment b', two first straight segments a' and two vertical connecting segments c'. The protrusion portion 122 generally extends along the left-right direction, the first straight segments a' and the second straight segment b' extend along a horizontal direction (the left-right direction illustrated in FIG. 2), the first straight segments a' are spaced apart from the second straight segment b' in the up-down direction (the up-down direction illustrated in FIG. 2), and the two first straight segments a' are located at two ends of the second straight segment b' along the left-right direction. The vertical connecting segments c' extend along the up-down direction (the up-down direction illustrated in FIG. 2), one of the two vertical connecting segments c' is used to connect the first straight segment a' located at the left side to a left end of the second straight segment b', the other one of the two vertical connecting segments c' is used to connect the first straight segment a' located at the right side to a right end of the second straight segment b'. A smooth-transition connecting portion f is provided between the second straight segment b' and the corresponding vertical connecting segment c'.

As illustrated in FIG. 2, a right angle d' is defined between a side wall surface of the first straight segment a' facing upwards and the corresponding vertical connecting segment c'. After verification by the experiments, when the right angle d' is defined between the side wall surface of the first straight segment a' facing upwards and the corresponding vertical connecting segment c', the anti-interference capacity of the signal of the antenna is enhanced. A rounded corner e' is defined between a side wall surface of the first straight segment a' facing downwards and the corresponding vertical connecting segment c'. After verification by the experiments, when the rounded corner e' is defined between the side wall surface of the first straight segment a' facing downwards and the corresponding vertical connecting segment c', the anti-interference capacity of the signal of the antenna is enhanced.

Figure 4:
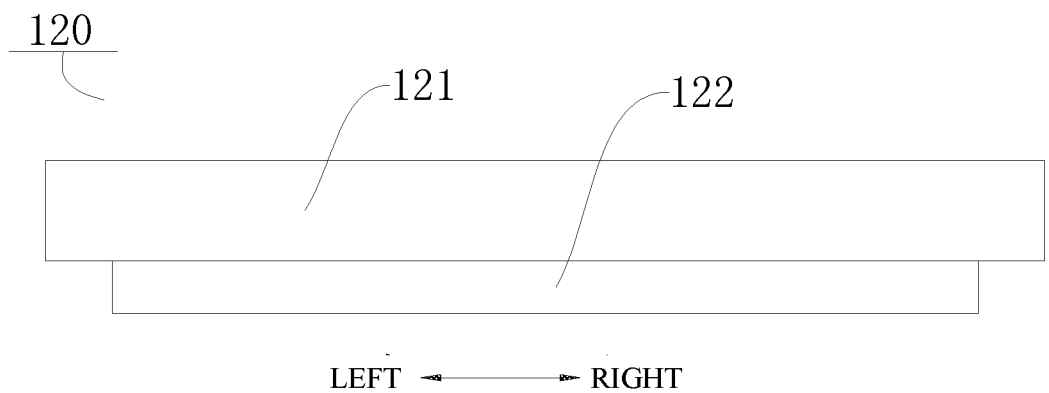
FIG. 4 illustrates a top view of the second blank of the blank assembly according to embodiments of the present disclosure.

Furthermore, as illustrated in FIGS. 3-4, the protrusion portion 122 is located at one side of the body portion 121 and is located in the middle of the body portion 121. For example, in the example illustrated in FIG. 3, the protrusion portion 122 is located on a rear surface of the body portion 121, and the protrusion portion 122 is located in the middle of the body portion 121. To improve the stability of connection between the first blank 110 and the second blank 120, in an example of the present disclosure, the body portion 121 and the first blank 110 may be connected by means of adhering or riveting. According to an embodiment of the present disclosure, a plurality of slits 111 may be provided, and a plurality of second blanks 120 may also be provided, the plurality of slits 111 corresponds to the plurality of second blanks 120 one to one. Furthermore, as to the plurality of second blanks 120, each the second blank 120 is provided with one protrusion portion 122.

As illustrated in FIGS. 1-8, the housing 200 for the terminal 300 according to embodiments of the present disclosure is produced by the above-mentioned blank assembly 100 for the housing 200. It should be noted that, the part of the second blank 120 located outside of the slit 111 is cut and the part of the second blank 120 located in the slit 111 is remained, such that the second blank 120 may be arranged in the slit 111 in the embedding manner.

In the housing 200 for the terminal 300 according to embodiments of the present disclosure, the second blank 120 partially extends into the slit 111 and the filler is used to fill the slit 111 to connect the part of the second blank 120 located in the slit 111 to the first blank 110, the second blank 120 may be partially arranged in the slit 111 in the embedding manner. During the subsequent processing, the part of the second blank 120 located outside the slit 111 may be directly cut so as to further form the housing 200, thus making it convenient for the blank assembly 100 to be processed into the housing 200 for the terminal 300, thereby simplifying the manufacturing process of the housing 200, improving the yield of the housing 200 and reducing the production cost.

Figure 8:
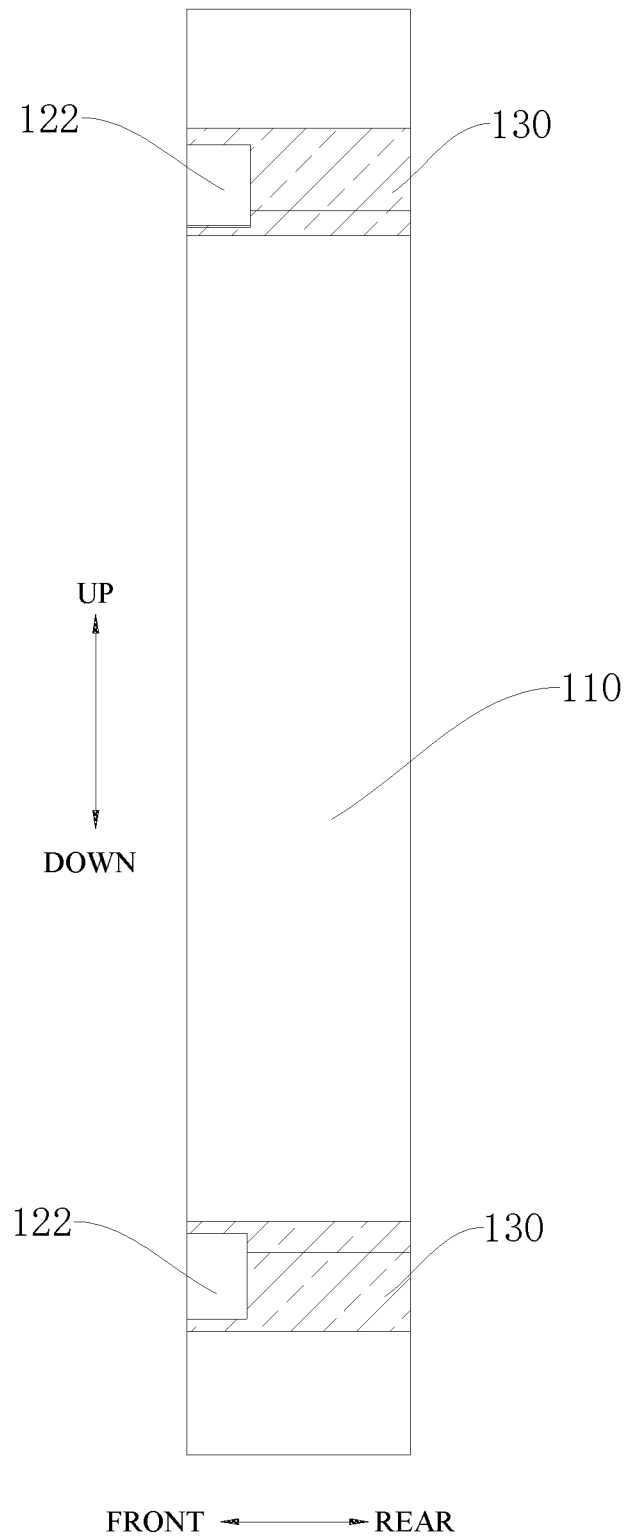
FIG. 8 illustrates a schematic view of a housing for a terminal according to embodiments of the present disclosure.

According to an embodiment of the present disclosure, as illustrated in FIG. 8, the second blank 120 is provided with the protrusion portion 122, and the protrusion portion 122 extends into the slit 111. When the first blank 110 is assembled with the second blank 120, the second blank 120 may be cut, so as to cut off the part of the second blank 120 located outside the slit 111 and remain the protrusion portion 122 in the slit 111. A front surface (a surface of the front side illustrated in FIG. 8) of the protrusion portion 122 is flush with a front surface (a surface of the front side illustrated in FIG. 8) of the first blank 110, thus not only improving aesthetics of appearance of the housing 200, but also improving performance of the antenna and the anti-interference properties thereof. Furthermore, a thickness of the protrusion portion 122 in the front-rear direction (the front-rear direction illustrated in FIG. 8) is less than the thickness of the first blank 110 in the front-rear direction (the front-rear direction illustrated in FIG. 8). In other words, the protrusion portion 122 may extend into the slit 111 along the front-rear direction, and as illustrated in FIG. 8, in the front-rear direction, the depth of the protrusion portion 122 extending into the slit 111 is less than the length of the slit 111.

Figure 9:
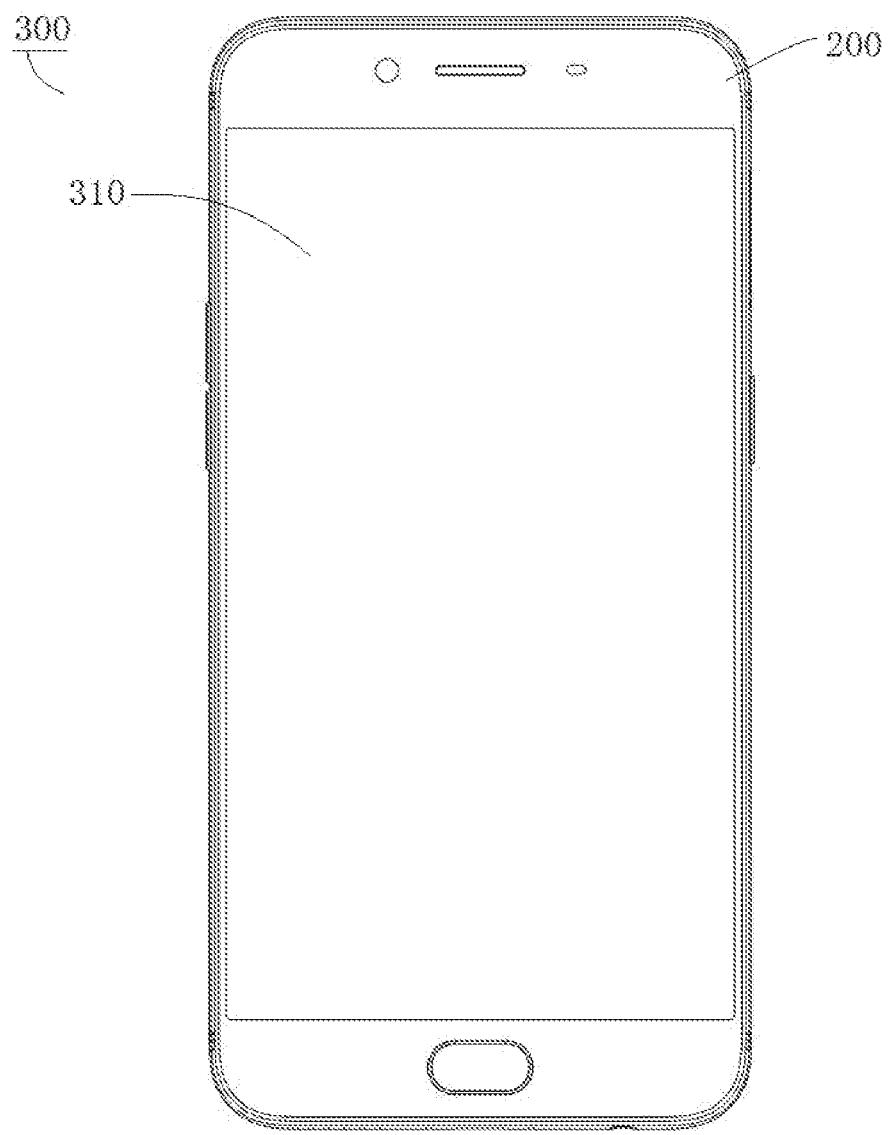
FIG. 9 illustrates a schematic view of a terminal according to embodiments of the present disclosure.

As illustrated in FIG. 9, the terminal 300 according to embodiments of the present disclosure includes the above-mentioned housing 200.

The "terminal" (or called as "communication terminal" or "mobile terminal") used herein includes, but is not limited to a device configured to be connected via a wired connection (such as a public switched telephone network (PSTN), a digital subscriber line (DSL), a digital cable, a direct cable connection, and/or another data connection/network) and/or receive/transmit a communication signal via a wireless interface (e.g., for a cellular network, a wireless local area network (WLAN), a digital television network such as a DVB-H network, a satellite network, an AM-FM broadcast transmitter, and/or another communication terminal). The communication terminal which is configured to communicate through the wireless interface may be called as a "wireless communication terminal", a "wireless terminal" and/or a "mobile terminal". The example of the mobile terminal includes, but is not limited to a satellite or cellular phone; a personal communication system (PCS) terminal which may combine a cellular radiotelephone with data processing, facsimile and data communication capacity; a PDA which may include a radiotelephone, a pager, an internet/intranet access, a Web browser, a blotter, a calendar and/or a global positioning system (GPS); and a regular laptop and/or a handheld receiver or other electric devices including a radiotelephone transceiver.

In the terminal 300 according to embodiments of the present disclosure, the second blank 120 partially extends into the slit 111 and the filler is used to fill the slit 111 to connect the second blank 120 located in the slit 111 to the first blank 110, the second blank 120 may be partially arranged in the slit 111 in the embedding manner. During the subsequent processing, the part of the second blank 120 located outside the slit 111 may be directly cut so as to further form the housing 200, thus making it convenient for the blank assembly 100 to be processed into the housing 200 for the terminal 300, thereby simplifying the manufacturing process of the housing 200, improving the yield of the housing 200 and reducing the production cost.

In the embodiments of the present disclosure, the terminal 300 may be a device capable of acquiring data from the exterior and processing the data, or the terminal 300 may be a device with a built-in battery and capable of obtaining current from outside to charge the battery, such as a mobile phone, a tablet PC, a computing device or an information display device, etc.

The terminal 300 applicable in the present disclosure is explained by taking a mobile phone as an example. In an embodiment of the present disclosure, the mobile phone may include a radio frequency circuit, a memory, an input unit, a wireless fidelity (WiFi) module, a display unit 310, a sensor, an audio circuit, a processor, a projecting unit, a camera unit, a battery or other components.

The radio frequency circuit may be configured to receive and send signals during an information receiving and sending process or a call. Particularly, the radio frequency circuit receives downlink information from a base station, then delivers the downlink information to the processor for processing, and sends uplink data of the mobile phone to the base station. Generally, the radio frequency circuit includes, but is not limited to, an antenna, at least one amplifier, a transceiver, a coupler, a low noise amplifier (LNA), and a duplexer. In addition, the radio frequency circuit may also communicate with a network and other devices by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory may be configured to store a software program and modules. The processor runs the software program and modules stored in the memory, to implement various functional applications and data processing of the mobile phone. The memory may mainly include a program storage area and a data storage area. The program storage area may store an operating system, an application program required by at least one function (such as a sound playback function and an image display function), and the like. The data storage area may store data (such as audio data and an address book, etc.) created according to use of the mobile phone, and the like. In addition, the memory may include a high speed random access memory, and may also include a non-volatile memory such as at least one magnetic disk storage device, a flash memory, or another volatile solid-state storage device.

The input unit may be configured to receive input digit or character information, and generate a keyboard signal related to the user setting and function control of the mobile phone. Specifically, the input unit may include a touch panel and other input devices. The touch panel, which may also be referred to as a touch screen, may collect a touch operation made by a user on or near the touch panel (such as an operation made by a user on or near the touch-sensitive panel by using any suitable object or accessory, such as a finger or a stylus), and drive a corresponding connection apparatus according to a preset program. Optionally, the touch panel may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor. Moreover, the touch controller can receive and execute a command sent from the processor. In addition, the touch panel may be a resistive, capacitive, infrared, or surface sound wave type touch-sensitive panel. In addition to the touch-sensitive panel, the input unit may further include other input devices. Specifically, the other input devices may include, but are not limited to, one or more of a physical keyboard, a functional key (such as a volume control key or a switch key), a track ball, a mouse, and a joystick.

The display unit 310 may be configured to display information input by the user or information provided for the user, and various menus of the mobile phone. The display unit 310 may include a display panel. Optionally, the display panel may be configured by using a liquid crystal display (LCD), an organic light-emitting diode (OLED), or the like. Further, the touch panel may cover the display panel. After detecting a touch operation on or near the touch panel, the touch panel transfers the touch operation to the processor, so as to determine the type of the touch event. Then, the processor provides a corresponding visual output on the display panel according to the type of the touch event.

The region in the display panel displaying the visual output which can be identified by human eyes may be used as the after-mentioned "display area". The touch panel and the display panel may be used as two separated parts to realize the input and output function of the mobile phone, or may be integrated to realize the input and output function of the mobile phone.

In addition, the mobile phone may further include at least one sensor, such as an attitude sensor, an optical sensor, and other sensors.

Specifically, the attitude sensor may also be referred to as the motion sensor. As one type of motion sensor, a gravity sensor may be enumerated. The gravity sensor may be made into a cantilever type shifter using an elastic sensitive element, and drive an electric contact using an energy storage spring made of an elastic sensitive element, such that the gravity change may be converted into the change of an electric signal.

As another type of motion sensor, an acceleration sensor may be enumerated. The acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like.

In an embodiment of the present disclosure, the above mentioned motion sensor may be used as an element for acquiring the after-mentioned "attitude parameters", but the present disclosure is not limited thereto. Other sensors able to acquire "attitude parameters" shall fall within the scope of the present disclosure, such as a gyroscope. The working principle and data processing of the gyroscope may be similar to those in the related art, the detailed explanations are omitted for simplicity.

In addition, in an embodiment of the present disclosure, other sensors, such as a barometer, a hygrometer, a thermometer, and an infrared sensor can be configured as the sensor, which are not further described herein.

The optical sensor may include an ambient light sensor and a proximity sensor. The ambient light sensor can adjust luminance of the display panel according to brightness of the ambient light. The proximity sensor may switch off the display panel and/or backlight when the mobile phone is moved to the ear.

The audio circuit, a loudspeaker, and a microphone may provide audio interfaces between the user and the mobile phone. The audio circuit may convert received audio data into an electric signal and transmit the electric signal to the loudspeaker. The loudspeaker converts the electric signal into a sound signal for output. On the other hand, the microphone converts a collected sound signal into an electric signal. The audio circuit receives the electric signal and converts the electric signal into audio data, and outputs the audio data to the processor for processing. Then, the processor sends the audio data to, for example, another terminal device by using the radio frequency circuit, or outputs the audio data to the memory for further processing.

WiFi is a short distance wireless transmission technology. The mobile phone may help, by using the WiFi module, the user to receive and send e-mails, browse a webpage, access streaming media, and so on, which provides wireless broadband Internet access for the user.

The processor is the control center of the mobile phone, and is coupled with various parts of the mobile phone by using various interfaces and lines. By running or executing the software program and/or modules stored in the memory, and invoking data stored in the memory, the processor performs various functions and data processing of the mobile phone, thereby performing overall monitoring on the mobile phone. Optionally, the processor may include one or more processing cores. Preferably, the processor may integrate an application processor and a modem. The application processor mainly processes an operating system, a user interface, an application program, and the like. The modem mainly processes wireless communication.

It may be understood that the foregoing modem may also not be integrated into the processor.

Moreover, the processor, used as an implementing element of the above mentioned processor, may perform same or similar functions as the processing units.

The mobile phone further includes the power supply (such as a battery) for supplying power to the components.

Preferably, the power supply may be logically coupled with the processor by using a power management system, thereby implementing functions such as charging, discharging and power consumption management by using the power management system. Although not illustrated in the figure, the mobile phone may further include a Bluetooth module, and the like, which is not further described herein.

It should be noted that, the mobile phone is merely an example of the terminal 300, and the present disclosure is not limited thereto. The present disclosure may be applied in a mobile phone, a tablet, or other electronic device, which is not limited herein.

A manufacturing method for the housing 200 according to embodiments of the present disclosure includes the following steps.

At S10: the first blank 110 is chosen, the first blank 110 defines the slit 111. Herein, one or more slits 111 may be provided. In the example illustrated in FIG. 1, two slits 111 are provided and the two slits 111 are spaced apart from each other in the up-down direction. For facilitating the processing, when a plurality of the slits 111 are provided, any two slits 111 have the same shape and equal size.

At S20: the second blank 120 is chosen, the second blank 120 has the protrusion portion 122. For example, as illustrated in FIGS. 2-4, the protrusion portion 122 is machined on the second blank 120, and the protrusion portion 122 may has the same shape that the slit 111 has, thereby making it convenient for the protrusion portion 122 to be fitted in the slit 111. In addition, for facilitating the subsequent processing, the protrusion portion 122 may be located at one side of the second blank 120 and located in the middle of the second blank 120.

Figure 5:
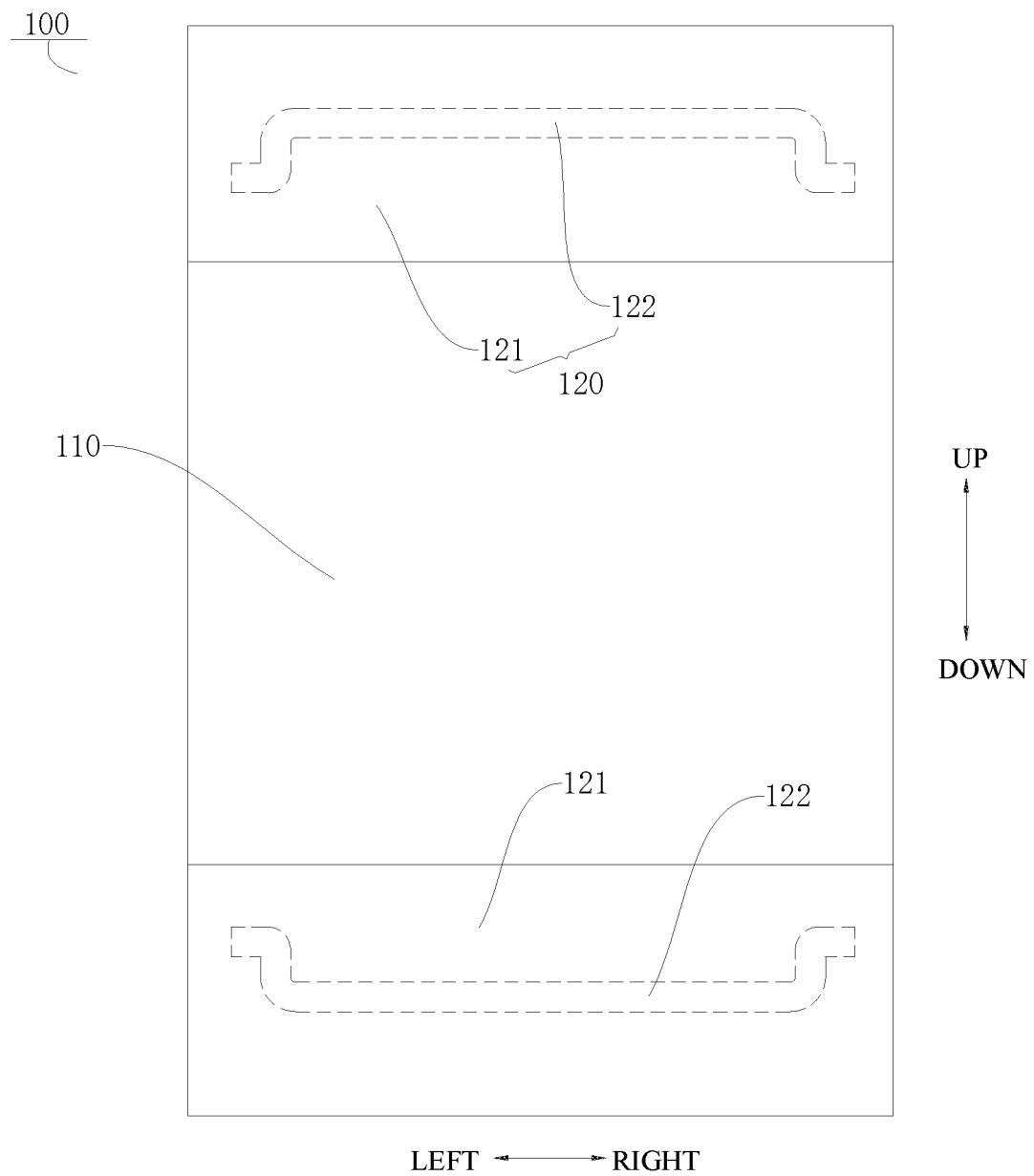
FIG. 5 illustrates a schematic view of a blank assembly according to embodiments of the present disclosure.

At S30: the second blank 120 is assembled with the first blank 110, and the protrusion portion 122 extends into the slit 111. As illustrated in FIGS. 5-6, the second blank 120 is assembled with the first blank 110, and the protrusion portion 122 of the second blank 120 is fitted in the slit 111 of the first blank 110.

At S40: the filler is filled in the slit 111 to form the filling layer 130, and the filler is provided between the outer surface of the protrusion portion 122 and the inner wall of the slit 111. As illustrated in FIG. 7, the filler and the protrusion portion 122 are located in the slit 111 and fill up the entire slit 111. In addition, in the slit 111, the outer surface of the protrusion portion 122 is not in direct contact with the inner wall of the slit 111, and the outer surface of the protrusion portion 122 is adhered to the inner wall of the slit 111 by means of the filler.

At S50: the part of the second blank 120 located outside the slit 111 is removed to form the housing 200. As illustrated in FIG. 8, the part of the second blank 120 located outside the slit 111 is removed, and the front surface of the first blank 110 is flattened, thereby acquiring the housing 200 for the terminal 300.

In the manufacturing method for the housing 200 according to embodiments of the present disclosure, the second blank 120 partially extends into the slit 111 and the filler is used to fill the slit 111 to connect the second blank 120 located in the slit 111 to the first blank 110, the second blank 120 may be partially arranged in the slit 111 in the embedding manner. During the subsequent processing, the part of the second blank 120 located outside the slit 111 may be directly cut so as to form the housing 200, thus making it convenient for the blank assembly 100 to be processed into the housing 200 for the terminal 300, thereby simplifying the manufacturing process of the housing 200, improving the yield of the housing 200 and reducing the production cost.

According to some embodiments of the present disclosure, the manufacturing method includes the following steps.

At S10: the first blank 110 is chosen, and the slit 111 is defined in the first blank 110 by cutting. For example, as illustrated in FIG. 1, the slit 111 may be defined in the first blank 110 by cutting, and one or more slits 111 may be provided. In the example illustrated in FIG. 1, two slits 111 are provided and the two slits 111 are spaced apart from each other in the up-down direction. For facilitating the processing, when a plurality of the slits 111 are provided, any two slits 111 have the same shape and equal size.

At S20: the second blank 120 is chosen, and the second blank 120 is machined on the protrusion portion 122 by cutting. For example, as illustrated in FIGS. 2-4, the second blank 120 is machined on the protrusion portion 122 by cutting, and the protrusion portion 122 may has the same shape that the slit 111 has, thereby making it convenient for the protrusion portion 122 to be fitted in the slit 111. In addition, for facilitating the subsequent processing, the protrusion portion 122 may be located at one side of the second blank 120 and located in the middle of the second blank 120.

At S30: the second blank 120 is assembled with the first blank 110, and the protrusion portion 122 extends into the slit 111. As illustrated in FIGS. 5-6, the second blank 120 is assembled with the first blank 110, and the protrusion portion 122 of the second blank 120 is fitted in the slit 111 of the first blank 110.

At S40: the filler is injected and molded in the slit 111 to form the filling layer 130, and the filler is provided between the outer surface of the protrusion portion 122 and the inner wall of the slit 111. As illustrated in FIG. 7, the filler and the protrusion portion 122 are located in the slit 111 and fill up the entire slit 111. In addition, in the slit 111, the outer surface of the protrusion portion 122 is not in direct contact with the inner wall of the slit 111, and the outer surface of the protrusion portion 122 is adhered to the inner wall of the slit 111 by means of the filler.

At S50: the part of the second blank 120 apart from the protrusion portion 122 is cut off, to form the housing 200. As illustrated in FIG. 8, the part of the second blank 120 located outside the slit 111 is cut off, and the front surface of the first blank 110 is flattened, thereby acquiring the housing 200 for the terminal 300.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A blank assembly for manufacturing a housing comprising:
    a first blank having an inner wall defining a through slit along a thickness direction of the first blank, the slit separating the housing into two parts and having a width ranging from 0.3 to 0.5 mm;
    a one-piece second blank comprising a body portion and a protrusion portion extending from the body portion, and at least part of the protrusion portion being located in the slit and having an outer surface spaced apart from the inner wall, a maximum depth of the second blank extending into the slit being less than a thickness of the first blank; and
    a filling layer filled in the slit, and at least the part of the protrusion portion extending into the slit being connected with the first blank by means of the filler.

2. The blank assembly according to claim 1, wherein the slit has the same shape that the protrusion portion has.

3. The blank assembly according to claim 1, wherein the protrusion portion is located at one side of the body portion and is located in the middle of the body portion.

4. The blank assembly according to claim 1, wherein the body portion and the first blank are connected by means of adhering or riveting.

5. The blank assembly according to claim 1, wherein a plurality of slits and a plurality of second blanks are provided, and the plurality of slits correspond to the plurality of second blanks one to one.

6. A housing for a terminal, produced by a blank assembly, the blank assembly comprising:
    a first blank having an inner wall defining a through slit along a thickness direction of the first blank, the slit separating the housing into two parts and having a width ranging from 0.3 to 0.5 mm;
    a one-piece second blank comprising a body portion and a protrusion portion extending from the body portion, and at least part of the protrusion portion being located in the slit and having an outer surface spaced apart from the inner wall, a maximum depth of the second blank extending into the slit being less than a thickness of the first blank; and
    a filling layer filled in the slit, and at least the part of the protrusion portion extending into the slit being connected with the first blank by means of the filler.

7. The housing according to claim 6, wherein the slit has the same shape that the protrusion portion has.

8. The blank assembly according to claim 6, wherein the protrusion portion is located at one side of the body portion and is located in the middle of the body portion.

9. The blank assembly according to claim 6, wherein the body portion and the first blank are connected by means of adhering or riveting.

10. The blank assembly according to claim 6, wherein a plurality of slits and a plurality of second blanks are provided, and the plurality of slits corresponds to the plurality of second blanks one to one.

11. A terminal, comprising a housing produced by a blank assembly, the blank assembly comprising:
    a first blank having an inner wall defining a through slit along a thickness direction of the first blank, the slit separating the housing into two parts and having a width ranging from 0.3 to 0.5 mm;
    a one-piece second blank comprising a body portion and a protrusion portion extending from the body portion, and at least part of the protrusion portion being located in the slit and having an outer surface spaced apart from the inner wall, a maximum depth of the second blank extending into the slit being less than a thickness of the first blank; and
    a filling layer filled in the slit, and at least the part of the protrusion portion extending into the slit being connected with the first blank by means of the filler.

12. The terminal according to claim 11, wherein the slit has the same shape that the protrusion portion has.

13. A manufacturing method for a housing, comprising:
S10: choosing a first blank, the first blank having an inner wall defining a slit, the slit separating the housing into two parts;
S20: choosing a second blank, the second blank having a protrusion portion;
S30: mounting the second blank on the first blank, the protrusion portion extending into the slit;
S40: filling a filler in the slit to form a filling layer, the filler being provided between an outer surface of the protrusion portion and the inner wall, and at least a part of the protrusion portion extending into the slit being connected with the first blank by means of the filler; and
S50: removing a part of the second blank located outside the slit, to form the housing.

14. The manufacturing method according to claim 13, wherein in the step S10, the first blank is cut to produce the slit.

15. The manufacturing method according to claim 13, wherein in the step S20, the second blank is cut to produce the protrusion portion.

16. The manufacturing method according to claim 13, wherein in the step S40, the filler is injected and molded in the slit to form the filling layer.

17. The manufacturing method according to claim 13, wherein in the step S50, the part of the second blank located outside the slit is cut off, to form the housing.

* * * * *